(12) United States Patent
Ohata et al.

(10) Patent No.: US 7,163,341 B2
(45) Date of Patent: Jan. 16, 2007

(54) BEARING TO BE USED FOR PULLEY IN AUXILIARY DEVICE FOR ENGINE

(75) Inventors: Toshihisa Ohata, Kanagawa (JP); Hiroshi Ishiguro, Kanagawa (JP)

(73) Assignee: NSK Ltd., Tokyo (JP)

( * ) Notice: Subject to any disclaimer, the term of this patent is extended or adjusted under 35 U.S.C. 154(b) by 160 days.

(21) Appl. No.: 10/502,588

(22) PCT Filed: Dec. 25, 2002

(86) PCT No.: PCT/JP02/13540

§ 371 (c)(1),
(2), (4) Date: Jul. 27, 2004

(87) PCT Pub. No.: WO03/064872

PCT Pub. Date: Aug. 7, 2003

(65) Prior Publication Data

US 2005/0078896 A1    Apr. 14, 2005

(30) Foreign Application Priority Data

Jan. 31, 2002    (JP)    ............................ 2002-024863

(51) Int. Cl.
*F16C 19/04*    (2006.01)

(52) U.S. Cl. .................. 384/450; 384/490; 384/513

(58) Field of Classification Search ................ 384/450, 384/470, 490, 491, 513, 523
See application file for complete search history.

(56) References Cited

U.S. PATENT DOCUMENTS

| | | | |
|---|---|---|---|
| 5,607,240 A * | 3/1997 | Kajihara et al. ............ 384/480 |
| 5,882,122 A * | 3/1999 | Noguchi et al. ............ 384/490 |
| 6,231,242 B1 | 5/2001 | Yano et al. |
| 6,273,230 B1 | 8/2001 | Nakano et al. |
| 6,524,008 B1 * | 2/2003 | Yatabe et al. ................ 384/450 |
| 6,634,792 B1 * | 10/2003 | Gorenne et al. ............ 384/450 |
| 2001/0038727 A1 | 11/2001 | Miyazaki et al. |

FOREIGN PATENT DOCUMENTS

| | | |
|---|---|---|
| EP | 0 746 080 A1 | 12/1996 |
| JP | 6-87768 U | 12/1994 |
| JP | 10-159579 A | 6/1998 |

(Continued)

*Primary Examiner*—Thomas R. Hannon
(74) *Attorney, Agent, or Firm*—Sughrue Mion, PLLC

(57) ABSTRACT

A bearing to be used for a pulley in an auxiliary device for the engine of an automobile includes an outer ring 3, an inner ring 5, double rows of balls 7 and 8, retainers 9 and 10, and seals 11 and 12 which are disposed on the rear surface sides of the retainers 9 and 10 so as to be spaced therefrom thereby to form spaces for accommodating grease, respectively. The bearing for a pulley used in an auxiliary device for the engine of an automobile is arranged in a manner that the outer diameter of the bearing is 65 mm or less, the width of the bearing is 45% or less of the inner diameter thereof, the diameter of each of the balls 7 and 8 is 4 mm or less, and a distance L between the rear surfaces 19 of the retainers 9 and 10 and the inner surfaces 20 of the seals 11 and 20 are set to be 13% or more of the diameter Da of the ball.

2 Claims, 4 Drawing Sheets

FOREIGN PATENT DOCUMENTS

| | | |
|---|---|---|
| JP | 11-82488 A | 3/1999 |
| JP | 11-210766 A | 8/1999 |
| JP | 11-336795 A | 12/1999 |
| JP | 2000-240663 A | 9/2000 |
| JP | 2003-49848 A | 2/2003 |

* cited by examiner

FIG. 3 (a)   PRIOR ART
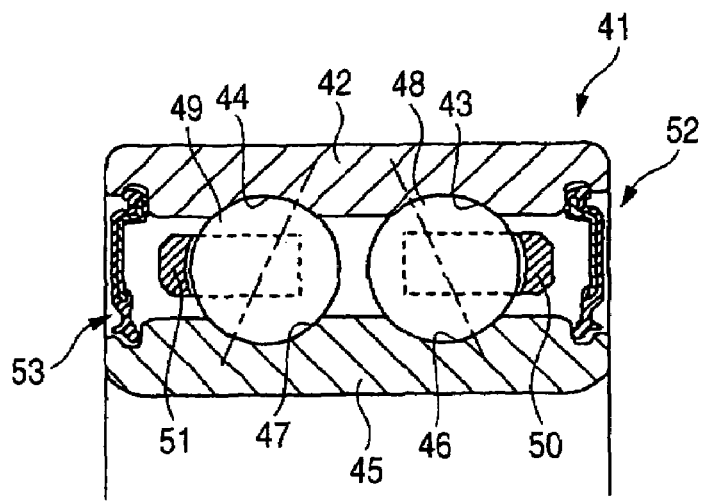
FIG. 3 (b)   PRIOR ART
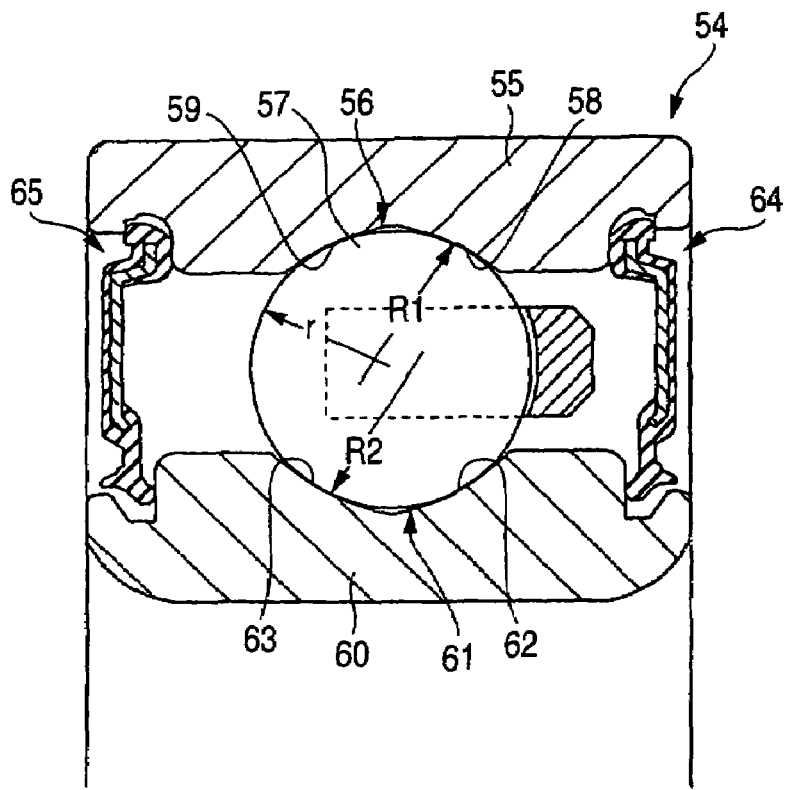

US 7,163,341 B2

BEARING TO BE USED FOR PULLEY IN AUXILIARY DEVICE FOR ENGINE

TECHNICAL FIELD

The present invention relates to a bearing to be used in a pulley for driving various kinds of auxiliary devices through an endless belt by the internal combustion engine of an automobile, and in particular, relates to a bearing to be used for a pulley in an auxiliary device for the en engine of an automobile which is used in various modes such as an auxiliary device provided or not-provided with an electromagnetic clutch and particularly suitable for a pulley for a compressor.

BACKGROUND ART

An internal combustion engine for an automobile is provided with various kinds of auxiliary devices such as an alternator, a compressor for an air conditioner, a cooling water pump. These devices are indirectly driven through a belt or directly driven by the crank shaft of the engine. Thus, each of the auxiliary devices is provided with a driven pulley so as to rotate the shaft of the device.

FIG. 4 shows a compressor 21 for compressing cooling medium for an air conditioner as an example of the auxiliary devices. The figure shows an example in which a swash plate 23 fixed to a rotation shaft 22 is rotated thereby to reciprocally move opposite-type pistons 25 sandwiched at their both side surfaces by balls 24 within cylinders 27 formed in a housing 26. The rotation shaft 22 is supported by needle bearings 28, 29 at the center portion of the housing 26.

A plate spring 31 is attached to the end portion of the rotation shaft 22 through an attachment bracket 30. An annular plate 32 made of magnetic material is fixed at the tip end of the plate spring 31. In the example shown in this figure, a driven pulley 37 with a U-sectional shape is supported through a bearing 36 at the outer periphery of a supporting cylindrical portion 35 protruded from the front head 33 of the compressor 21. A solenoid 38 fixed on the front head 33 side is disposed in a space of the U-sectional shape and the annular plate 32 made of magnetic material is disposed at a position opposing through the annular wall portion 39 of the driven pulley 37 to the solenoid 38, thereby constituting an electromagnetic clutch 40.

In the electromagnetic clutch 40, when the solenoid 38 is not supplied with a current, the annular plate 32 is separated from the annular wall portion 39 of the driven pulley 37 as shown in the figure. Thus, even when the driven pulley 37 is rotated by an endless belt, the annular plate 32 does not rotate and hence the compressor 21 does not operate. In contrast, when the solenoid 38 is supplied with a current, the annular plate 32 made of magnetic material is attracted by the magnetic force of the solenoid and so urged against the annular wall portion 39, whereby the electromagnetic clutch 40 is placed in a coupling state. Thus, the driven pulley 37 rotates, then the annular plate 32 also rotates integrally with the driven pulley thereby to rotate the swash plate 23 through the plate spring 31, the attachment bracket 30 and the rotation shaft 22, whereby the piston 25 is reciprocally moved thereby to operate the compressor 21.

In such a compressor for a vehicle, various kinds of the bearings 36 for supporting the driven pulleys 37 are employed. Conventionally, most of the compressors for vehicles employ double-row radial ball bearings 41 as shown in FIG. 3(a). FIG. 4 shows an example in which such a double-row radial ball bearing is used. In this bearing, double rows of balls 48, 49 are disposed between the double rows of outer raceways 43, 44 formed on the inner peripheral surface of an outer ring 42 and the double rows of inner raceways 46, 47 formed on the outer peripheral surface of an inner ring 45 in opposite to the outer raceways 43, 44, respectively. The balls of the respective rows are held in retainers 50, 51 with a predetermined interval, respectively. Seals 52, 53 are provided at the side portions of the balls 48, 49, respectively, so as to seal in a manner that grease within the seals does not leak therefrom and water, dust etc. does not enter within the seals from the outside.

As described above, in the case of using the conventional double-row radial ball bearing as a bearing for the pulley of a compressor, even when a small amount of an eccentric load is applied to the driven pulley 37 from the endless belt wound around the driven pulley 37, there scarcely arise such a case where the center axis of the outer ring 42 and the center axis of the inner ring 45 constituting the bearing 40 do not coincide to each other and so the bearing inclines. In particular, when the bearing is configured as an angular bearing as shown in FIG. 3(a), the bearing can even cope with a large eccentric load. Thus, sufficient durability of the bearing can be secured, and further the rotation center of the driven pulley 4 is prevented from inclining thereby to also prevent eccentric wear of the endless belt.

However, in the case of using the conventional double-row radial ball bearing, the bearing including the balls each having a relatively large diameter is used in order to surely receive a large load. As a result, the bearing inevitably becomes large in its size and so the width of the bearing along the axis line direction thereof also becomes large inevitably. However, the devices for a vehicle are demanded to be as small as possible in their weights and sizes. Thus, when the width of the bearing becomes large, various members such as supporting members for the bearing become large and so heavy and further become bulky as a whole, undesirably.

As a countermeasure of such a phenomenon, it is considered to use a bearing including balls each having a small diameter in order to make the conventional double-row ball bearing smaller thereby to reduce the width of the bearing along the axis line direction thereof. In this case, since the durability is degraded as the diameter of the ball becomes smaller, it has been thought that the miniaturization of the double-row ball bearing is limited. Thus, it has been thought that it is suitable to use a single-row deep groove ball bearing in order to narrow the width of the bearing, and a research is made as to the improvement of the single-row deep groove ball bearing.

That is, in the case of using a normal single-row radial ball bearing as the bearing for a driven pulley configured in the aforesaid manner, when the driven pulley 37 receives an eccentric load, the bearing has not a sufficient force for preventing the inclination of the driven pulley 37, whereby the degree of deviation or inconsistency between the center axis of the outer ring and the center axis of the inner ring constituting the radial ball bearing becomes remarkable. As result, not only the durability of the radial ball bearing becomes insufficient but also remarkable eccentric wear occurs at the endless belt wound around the driven pulley 37. In view of this point, a research is made to configure the single-row deep groove ball bearing as a four-point contact type.

According to such a research, as shown by an enlarged diagram of FIG. 3(b), an outer raceway 56 formed on the inner peripheral surface of an outer ring 55 is configured by two loci, that is, a first outer raceway 58 which is disposed on the right side of a ball 57 in the figure and has a curvature radius R1 larger than the curvature radius r of the ball 57 and a second outer raceway 59 which is disposed on the left side and has the same curvature radius, whereby the outer raceway 56 is configured in a so-called Gothic arch shape. Similarly, an inner raceway 61 formed on the outer peripheral surface of an inner ring 60 is configured by two loci, that is, a first inner raceway 62 and a second inner locus 63 each having a curvature radius R2 larger than the curvature radius r of the ball 57, whereby the inner locus also forms a locus of a so-called Gothic arch shape. Accordingly, the ball 57 contacts with the four points of the respective loci. In this bearing, seals 64 and 65 are also provided on the both sides of the ball, respectively.

Such a radial ball bearing of a four-point contact type has a larger rigidity with respect to an eccentric load as compared with a general single-row deep groove radial ball bearing and so the center axis of the outer ring 55 hardly deviates from the center axis of the inner ring 60 even when an eccentric load is applied thereto. An example where such a radial ball bearing of a four-point contact type is applied to a driven pulley for a compressor with an electromagnetic clutch is disclosed in JP-A-11-210766, for example, and also disclosed in other many known documents. As described in the above-publication, the improvement can be made by a three-point contact type as well as the aforesaid four-point contact type as compared with the conventional bearing.

As described above, although the problem caused by an eccentric load applied to the pulley is solved by using the double-row ball bearing, it has been thought that the usage of the double-row ball bearing is limited since a bearing with a narrower width in the axis line direction is required. Thus, a research is made as to the usage of the single-row ball bearing and so a research is made as to the aforesaid ball bearing of a four-point contact type etc. However, even when the single-row ball bearing is used, the diameter of a ball is required to be smaller in order to obtain a bearing with a narrower width.

However, it was found that, in the single-row ball bearing, a volume of vibration sound of the belt became larger when the diameter of the ball was made smaller. Many experimentations were repeatedly made as to the relation between the vibration sound and the diameter of the ball, whereby it was found that a volume of the vibration sound became large when the diameter of the ball becomes 5 mm or less, particularly. This result of the experimentations is shown in a table 1. This table shows the diameters of the ball where a volume of the vibration sound particularly changed when the diameter of the ball of the single-row ball bearing was changed. As clear from this table, in the single-row ball bearing, a volume of the vibration sound increases when the diameter of the ball reduces to about 5 mm, and then a volume of the vibration sound is large and so the bearing is not suitable to be mounted on a vehicle when the diameter of the ball is 4 mm. Thus, a ball with a small diameter such as 4 mm, 3 mm can not be used and so it was found that the reduction of the width of the bearing in the axis line direction is limited in this view point.

TABLE 1

| diameter of ball of single-row ball bearing | volume of vibration sound of belt |
|---|---|
| 6 | small |
| 5 | middle |
| 4 | large |

DISCLOSURE OF THE INVENTION

The invention mainly intends, in a bearing for a driven pulley driven by an engine for an automobile, to provide the bearing for a pulley used in an auxiliary device for the engine of an automobile which can reduce the width in an axis line direction thereof.

A bearing to be used for a pulley in an auxiliary device for the engine of an automobile according to the invention includes an outer ring having double-rows of outer raceway grooves on an inner peripheral surface of the outer ring, an inner ring having double-rows of inner raceway grooves on the outer peripheral surface of the inner ring, and balls which are disposed between the outer raceway grooves and the inner raceway grooves respectively and each of which has a diameter of 4 mm or less, wherein the outer diameter of the bearing is 65 mm or less and the width of the bearing is 45% or less of an inner diameter of the bearing.

Further, a bearing to be used for a pulley in an auxiliary device for an engine of an automobile according to the invention includes an outer ring having double-rows of outer raceway grooves on the inner peripheral surface of the outer ring, an inner ring having double-rows of inner raceway grooves on the outer peripheral surface of the inner ring, balls which are disposed between the outer raceway grooves and the inner raceway grooves respectively and each of which has a diameter of 4 mm or less, a retainer having a rear surface and retaining the balls, and a seal disposed on the rear surface side of the retainer so as to be spaced therefrom thereby to form a space for accommodating grease, wherein the outer diameter of the bearing is 65 mm or less, the width of the bearing is 45% or less of an inner diameter of the bearing, and a distance between the rear surface of the retainer and an inner surface of the seal is 13% or more of the diameter of the ball.

BRIEF DESCRIPTION OF THE DRAWINGS

FIGS. 3(a) and (b) show a conventional ball bearing, in which (a) shows a sectional diagram of a double-row ball bearing and (b) shows a sectional diagram of a four-point contact type single-row ball bearing.

BEST MODE FOR CARRYING OUT THE INVENTION

Figure 4:
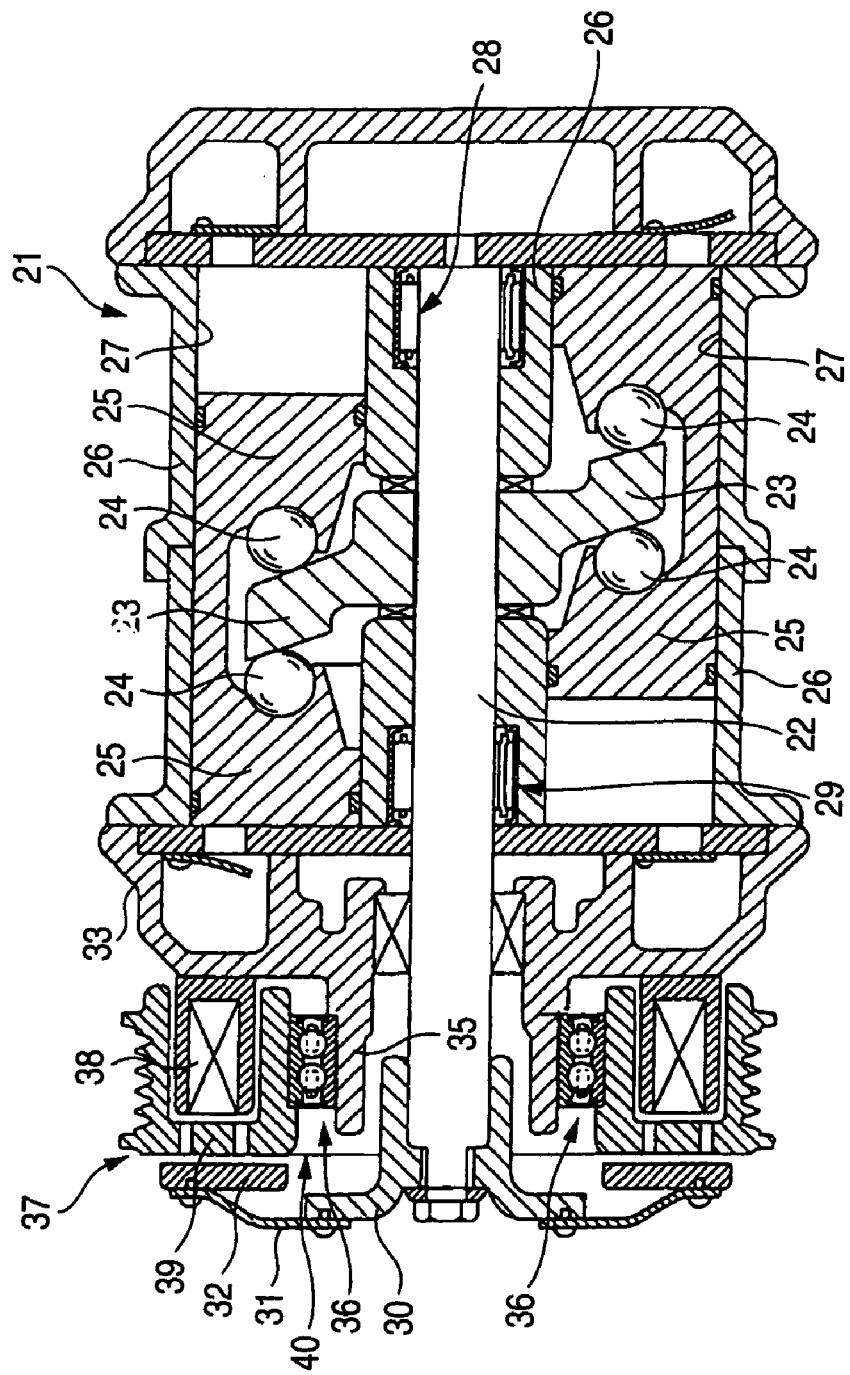
FIG. 4 is a sectional diagram showing an example which uses a bearing for a pulley used in a compressor with an electromagnetic clutch for an air conditioner as a conventional bearing for a pulley used in an auxiliary device for the engine of an automobile.

An embodiment of the invention will be explained with reference to drawings. As described above, when a single-row ball bearing is used as a bearing for a pulley for driving a compressor used as an auxiliary device of the engine for an automobile as shown in FIG. 4, for example, a volume of the vibration sound of the belt increases and so the bearing is not suitable to be mounted on a vehicle when the diameter of a ball reduces to about 5 mm, as shown in the table 1. The inventors of the invention tried to perform an experimentation that balls each having a diameter of 4 mm, which is determined to be not suitable for a single-row ball bearing as described above, are employed in a double-row ball bearing. The result of such an experimentation is shown in a table 2.

TABLE 2

| size of sample bearing | | | volume of vibration sound of belt | | | |
|---|---|---|---|---|---|---|
| | | | single-row ball bearing | | double-row ball bearing | |
| inner diameter (mm) | outer diameter (mm) | width (mm) | diameter of ball (mm) | vibration sound | diameter of ball (mm) | vibration sound |
| 30 | 47 | 12 | 4.0 | large | 3.0 | small |
| 35 | 52 | 12 | 4.0 | large | 3.0 | small |
| 35 | 55 | 13 | 4.0 | large | 3.5 | small |
| 40 | 62 | 14 | 4.0 | large | 3.5 | small |
| 40 | 65 | 18 | 4.0 | large | 4.0 | small |

TABLE 3

Result of endurance test in a double-row angular bearing including balls each having a diameter (Da) of 3.5 mm (broke off upon lapse of 250 hours)

| distance (L) between retainer and inner surface of seal | seizure |
|---|---|
| 0.35 mm (ratio of distance relative to diameter of ball: 10%) | occur |
| 0.45 mm (ratio of distance relative to diameter of ball: 13%) | not occur |
| 0.75 mm (ratio of distance relative to diameter of ball: 21%)) | not occur |
| 1.10 mm (ratio of distance relative to diameter of ball: 31%) | not occur |

As clear from the above result of the experimentation, it was found that the vibration sound does not occur in a double-row ball bearing even when balls each having a diameter of 4 mm, which can not be used in a single-row ball bearing due to a large volume of the vibration sound of a belt, are used and also even when balls each having a smaller diameter of 3 mm are used. Thus, in order to cope with the demand for developing a bearing having a narrower width, the inventors of the invention further repeatedly made experimentations of a double-row ball bearing using smaller balls based on a knowledge that it is necessary to use a double-row ball bearing using smaller balls. As a result of the experimentation, it was found that there arises a problem of causing seizure at an early stage depending on a condition in the double-row ball bearing using the balls each having a diameter of 4 mm, for example.

Thus, the inventors of the invention repeatedly made various experimentations in order to investigate the cause of this problem and finally found that a main cause of the seizure is that grease filled in the bearing becomes shortage when the diameter of the ball is made small. Further, the inventors of the invention thought as a countermeasure of the seizure that it is necessary to hold as much grease as possible as a means for not causing the shortage of the grease for a long term even in the double-row ball bearing using the balls each having a small diameter. Then, the inventors thought that it is most suitable to secure a sufficient distance between the ball and a seal as this means, and reached a conclusion that a distance between the rear surface of a retainer and the inner surface of the seal opposing to the rear surface is preferably made larger than a predetermined value particularly as a space for always securing the grease.

Further, the inventors of the invention investigated through experimentations as to how long is the predetermined value, that is, how long is the distance between the retainer and the inner surface of the seal in order not to cause the seizure, and what criterion is to be used in order to obtain distances common to all of the bearings. As a result of the investigation, it was found that the distance between the retainer and the inner surface of the seal should be determined by using a diameter of the ball as the criterion and that the seizure does not occur when a ratio of the distance relative to the diameter of the ball is secured to be 13% or more. The result of the experimentations is shown in a table 3.

Figure 1:
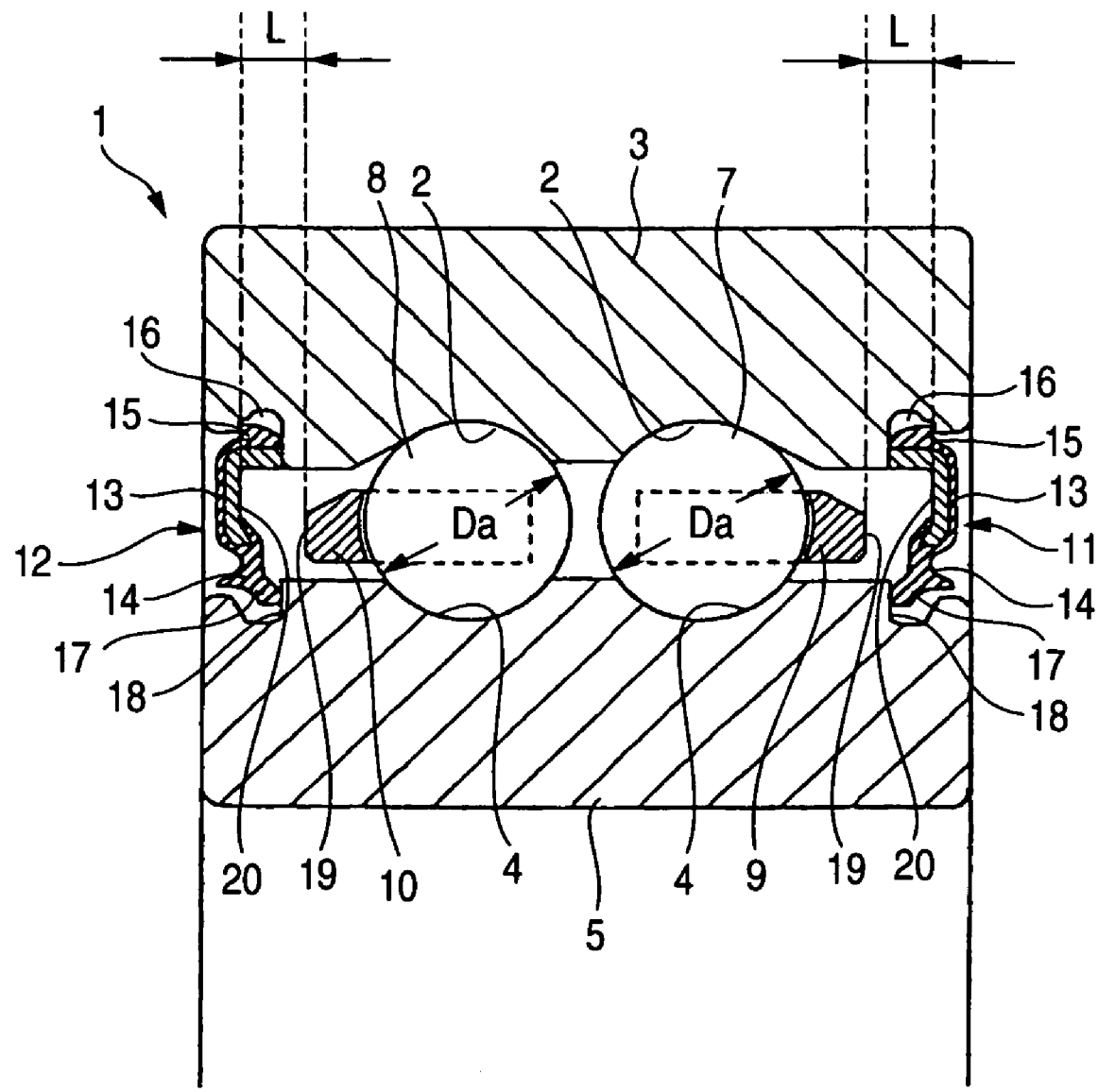
FIG. 1 is a sectional diagram of a double-row ball bearing according to an embodiment.
Figure 2:
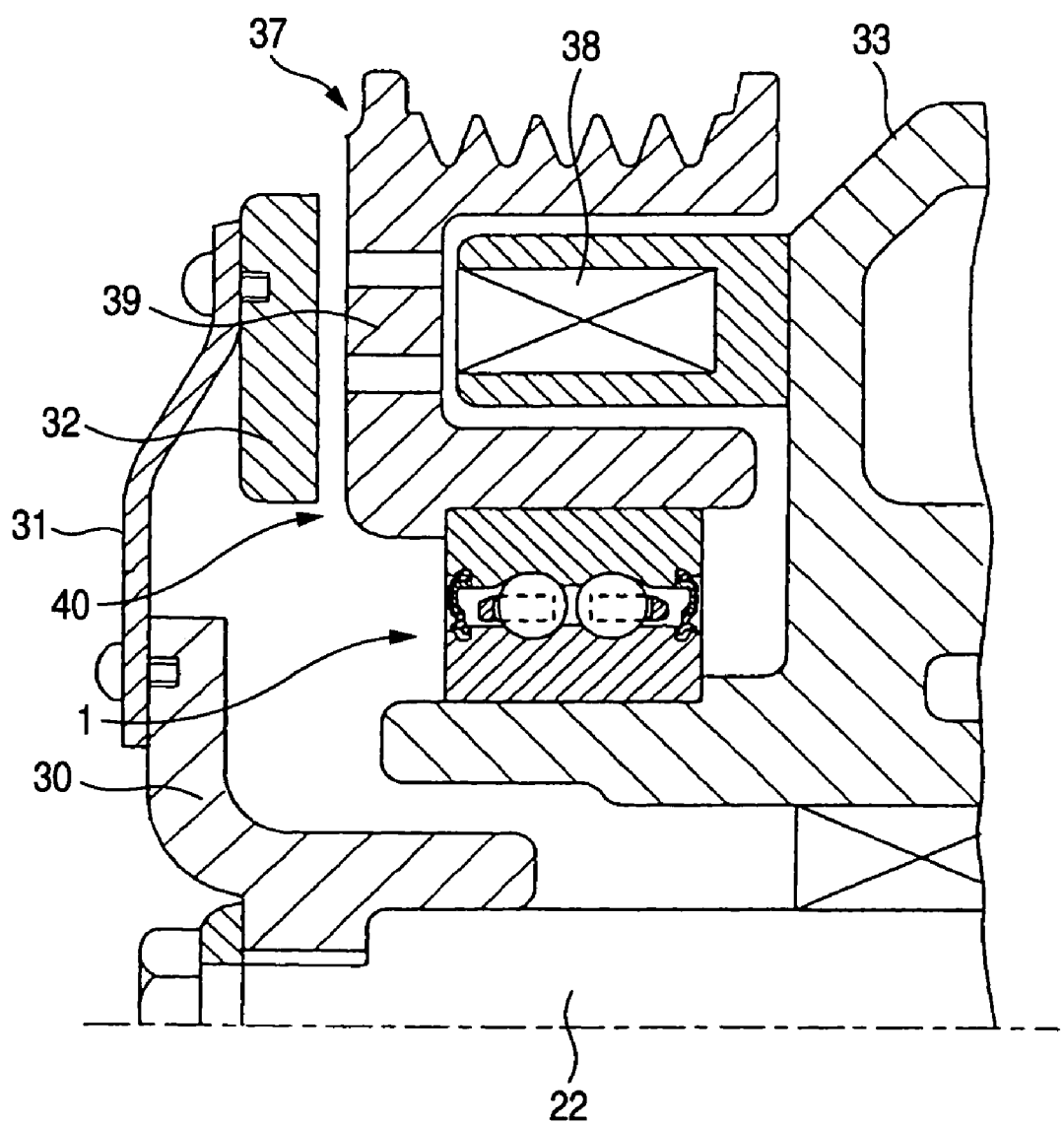
FIG. 2 is a sectional diagram showing an example which uses the double-row ball bearing as a bearing for a pulley used in a compressor.

Such a bearing is shown in FIG. 1. FIG. 2 shows an example in which such a bearing is used as a bearing for a pulley used in a compressor as shown in FIG. 4 in the pulley for the engine of an automobile. In the double-row ball bearing 1 shown in FIG. 1, balls 7, 8 each having a diameter Da of 4 mm or less are provided between an outer ring 3 forming outer raceways 2, 2 on the inner peripheral surface thereof and an inner ring 5 forming inner raceways 4, 4 on the outer peripheral surface thereof, and the balls 7, 8 are held by retainers 9, 10 with the same interval therebetween, respectively. Seals 11, 12 are provided on the rear surface sides of the retainers, respectively. Like the conventional seals, each of these seals is formed by burning a sealing rubber 14 of a predetermined configuration to a cored bar 13. The base end portion 15 of the seal is fit into a fitting groove 16 formed at the outer ring and the tip end portion 17 of the seal is abutted against a protruded side wall 18 formed at the inner ring 6 by an elastic force of the tip end portion, thereby securing sealing property.

The double-row ball bearing 1 is assembled in a manner as shown in FIG. 2 and used as a bearing for a pulley. This figure corresponds to an enlarged diagram of the pulley portion of the compressor shown in FIG. 4 and shows an example in which a bearing having a width narrower than that of FIG. 4 is used thereby to miniaturize peripheral members of the bearing and further a pulley having a width narrower than that of FIG. 4 is used. All of the respective members shown in FIG. 2 are same as those shown in FIG. 4. Since the functions etc. of the respective members and the electromagnetic clutch are already described with reference to FIG. 4, portions of FIG. 2 identical to those of FIG. 4 are referred to by the common symbols, with explanation thereof being omitted.

The double-row ball bearing according to the invention is arranged in a manner as shown in FIG. 1 that a distance L between the rear surface 19 of the retainer 9 and the inner surface 20 of the seal 11 is set to be 13% or more of the diameter Da of the ball. That is, in the endurance test shown in the table 3, the double-row angular ball bearing including the balls each having a diameter of 3.5 mm was used, then the endurance test of 250 hours was executed and the bearing which did not cause any seizure upon the termination of the test is determined as a bearing durable for a practical use. Thus, all of the bearings which caused seizure before the termination of the test are determined as bearings not suitable for a practical use and indicated as "seizure occur" in the table. As the result of the experimentation, since it is clear that the seizure likely occurs as the distance L between the retainer and the inner surface of the seal becomes smaller, the table particularly indicates the values around the distance at which the seizure starts occurring and the distance at which the seizure starts occurring scarcely. Incidentally, although the aforesaid explanation is made as to the retainer 9 and the seal 11 in relation to the ball 7, the action etc. of which is quite same in the retainer 10 and the seal 12 in relation to the ball 8.

As clear from the table 3, as to the ball having a diameter of 3.5 mm, the seizure occurred when the distance (L) between the retainer and the inner surface of the seal is 0.35 mm or less, whilst the seizure did not occur when the distance is 0.45 mm or more which is larger by 0.1 mm than the former case. The seizure did not occur in any of the bearings each having the distance L larger than 0.45 mm. It is suitable to use the diameter Da of the ball as a reference in order to generalize the aforesaid distances to the bearings of all sizes. Viewing these values with reference to the ratios of the distances relative to the diameter of the ball, as shown in the table, it can be said that the seizure occurs when the ratio is 10% or less and the seizure does not occur when the ratio is 13% or more. It was confirmed that this fact applies to other balls each having a diameter of 4 mm or less. In particular, in bearings each of which outer diameter is 6.5 mm or less and each of which width is 45% or less of the inner diameter of the bearing, each of which is suitable to be used in the pulley for an auxiliary device for the engine of an automobile to which the invention is applied, there has not been known any bearing in which the double rows of the balls each having a small diameter as described above are provided and the distance between the retainer and the inner surface of the seal is set to be large as described above.

At the time of actually using such a double-row ball bearing as a bearing for a pulley as shown in FIG. 2, there is a demand to shorten the length of the bearing along the axis line direction, that is, the width of the bearing as possible. Further, in the case of using balls each having a diameter of 4 mm or less in a bearing having an outer diameter of 6.5 mm or less and a width of 45% or less of the inner diameter thereof as described above, it will be understood based on the aforesaid results that the bearing may be designed in a manner that the distance between the retainer and the inner surface of the seal is secured to be at least 13% or more of the diameter of the ball, this portion is designed as large as possible in view of a room of the entire size, and a space for accommodating grease is secured.

In the aforesaid embodiment, although the example is shown in which the invention is applied to a bearing for a pulley used in the compressor of an air conditioner using an electromagnetic clutch as the bearing for a pulley used in an auxiliary device for the engine of an automobile, the invention is not limited thereto and can be used as a bearing for a pulley not using an electromagnetic clutch or a bearing for a pulley for driving various kinds of auxiliary devices such as a tension pulley, an idler as an example of a pulley, an alternator, a cooling water pump.

As described above, although the invention is explained in detail with reference to the particular embodiment, it will be apparent for those skilled in the art that the invention may be modified or changed in various manner without departing from the spirit and scope of the invention.

The present application is based on Japanese Patent Application (Japanese Patent Application No. 2002-024863) filed on Jan. 31, 2002, the content of which is incorporated herein by reference.

INDUSTRIAL APPLICABILITY

Since the invention is configured in the aforesaid manner, the invention can surely cope with an eccentric load applied to a pulley by forming as a double-row ball bearing and can prevent eccentric wear of a belt caused by the inclination of the pulley. Further, in bearings each of which outer diameter is 6.5 mm or less and each of which width is 45% or less of the inner diameter thereof, each of which is suitable to be used in the pulley for an auxiliary device for the engine of an automobile to which the invention is applied, since the diameter of each of the balls is set to be 4 mm or less, the width of the bearing along the axis line direction thereof can be made smaller as compared with the conventional ones. Although a single-row ball bearing using the balls each having a diameter of 4 mm or less generates a large vibration sound from a belt, the double-row ball bearing can prevent generation of such a vibration sound. Further, since the balls each having a small diameter can be used, the device can be entirely miniaturized and lightened. Furthermore, since the distance between the retainer and the inner surface of the seal is set to be 13% or more of the diameter of the ball, it is possible to secure such a degree of a grease accommodating space not causing seizure even if the bearing is used for a long time.

The invention claimed is:

1. A bearing to be used for a pulley in an auxiliary device for an engine of an automobile, comprising:
    an outer ring having double-rows of outer raceway grooves on an inner peripheral surface of the outer ring;
    a single inner ring having double-rows of inner raceway grooves on an outer peripheral surface of the inner ring; and
    balls which are disposed between the outer raceway grooves and the inner raceway grooves respectively and each of which has a diameter of 4 mm or less;
    wherein an outer diameter of the bearing is 65 mm or less and a width of the bearing is 45% or less of an inner diameter of the bearing.

2. A bearing to be used for a pulley in an auxiliary device for an engine of an automobile, comprising:
    an outer ring having double-rows of outer raceway grooves on an inner peripheral surface of the outer ring;
    an inner ring having double-rows of inner raceway grooves on an outer peripheral surface of the inner ring;
    balls which are disposed between the outer raceway grooves and the inner raceway grooves respectively and each of which has a diameter of 4 mm or less;
    a retainer having a rear surface and retaining one row of the balls; and
    a seal disposed on rear surface side of the retainer so as to be spaced therefrom thereby to form a space for accommodating grease, wherein
    an outer diameter of the bearing is 65 mm or less, a width of the bearing is 45% or less of an inner diameter of the bearing, and a distance between the rear surface of the retainer and an inner surface of the seal is 13% or more of the diameter of the ball.

* * * * *